UNITED STATES PATENT OFFICE.

BERT MILLISON, OF BROOKLYN, NEW YORK.

INK.

SPECIFICATION forming part of Letters Patent No. 671,972, dated April 16, 1901.

Application filed April 21, 1899. Serial No. 713,958. (No specimens.)

*To all whom it may concern:*

Be it known that I, BERT MILLISON, a citizen of the United States, residing in the borough of Brooklyn, city of New York, State of New York, have invented certain new and useful Improvements in Ink, of which the following is a specification.

The object of this invention is to produce an ink which shall be especially adapted for use in stencil-printing machines, in which the ink is fed from a pad, between which and the pad the stencil-sheet, usually of perforated waxed paper, is placed. An ink for such purposes should possess certain characteristics, such as a considerable degree of fluidity, so that it shall flow readily, penetrating the prepared portions of the stencil-sheet. It should also possess sufficient viscosity to prevent it from flowing except when pressure is applied to the stencil. It should also be free from such ingredients as will have a tendency to affect the stencil-sheet, being neutral with respect thereto. It is desirable also that such an ink should be capable of use immediately after preparation and without requiring any considerable time for it to set or any of its ingredients to become assimilated, that it shall not while in bulk dry out nor separate nor otherwise change its character, and that it shall dry quickly upon the printed sheet or at least shall have no tendency to rub or smut upon the freshly-printed sheets.

In carrying out the invention one part of any suitable pigment, such as the ordinary anilin color or pigment of commerce, preferably in the form of a dry powder soluble in water, an approximately equal quantity of soap, preferably a mild soap made of a vegetable oil, such as castile-soap, which is used in a powdered form, and one hundred parts, more or less, of glycerin are thoroughly mixed together, the soap being dissolved in the liquid. The several ingredients above mentioned may be all mixed together at once, the temperature of the glycerin being raised somewhat to facilitate the dissolving of the soap. If desired, however, the pigment and the soap may be dissolved separately and the two solutions then mixed together. The ink thus prepared is ready for use at once, but can be kept in bulk for a long time without losing any of its desirable characteristics, as it does not settle nor separate and there is no water or other more volatile fluid in its composition to evaporate. The soap prevents the compound from being sticky or tacky in use. Of the small quantity which is applied to the impression-paper the glycerin is absorbed by the paper, carrying the pigment with it, so that it will not spread or smut, even though the freshly-printed sheets are handled. Furthermore, the ink spreads uniformly through the prepared portions of the stencil-sheet, but does not fill or clog them, whereby a clean and sharp impression is produced.

I claim as my invention—

1. A permanent, flowing ink, adapted to penetrate the cloth surface of an inking-pad or a stencil-sheet without clogging the same composed of approximately equal parts of soap and pigment and a relatively large amount of glycerin, substantially as set forth.

2. A permanent, flowing ink, adapted to penetrate the cloth surface of an inking-pad or a stencil-sheet without clogging the same composed of approximately equal parts of a mild soap such as castile and a pigment and a relatively large amount of glycerin, substantially as set forth.

3. An ink for the purposes described composed of approximately one part each of powdered castile-soap and pigment and approximately one hundred parts of glycerin, substantially as set forth.

This specification signed and witnessed this 20th day of April, A. D. 1899.

BERT MILLISON.

In presence of—
ANTHONY N. JESBERA,
W. B. GREELEY.